United States Patent
Lebrun et al.

(10) Patent No.: US 9,937,658 B2
(45) Date of Patent: Apr. 10, 2018

(54) LINK BETWEEN A THIN METAL LINER AND A COMPOSITE WALL BY THERMOPLASTIC PARTICLE-FILLED COATING

(71) Applicant: AIRBUS DEFENCE AND SPACE SAS, Les Mureaux (FR)

(72) Inventors: Hélène Lebrun, Lyons (FR); Brigitte Defoort, Saint Medard en Jalles (FR); Dominique Lacour, Tresses (FR); Audrey Menochet, Le Bouscat (FR)

(73) Assignee: AIRBUS DEFENCE AND SPACE SAS (FR)

( * ) Notice: Subject to any disclaimer, the term of this patent is extended or adjusted under 35 U.S.C. 154(b) by 362 days.

(21) Appl. No.: 14/781,947

(22) PCT Filed: Mar. 26, 2014

(86) PCT No.: PCT/EP2014/056030
§ 371 (c)(1),
(2) Date: Oct. 2, 2015

(87) PCT Pub. No.: WO2014/161753
PCT Pub. Date: Oct. 9, 2014

(65) Prior Publication Data
US 2016/0031152 A1  Feb. 4, 2016

(30) Foreign Application Priority Data

Apr. 3, 2013 (FR) .................................. 13 52986

(51) Int. Cl.
*B32B 37/00* (2006.01)
*B29C 65/02* (2006.01)
(Continued)

(52) U.S. Cl.
CPC ........ *B29C 65/022* (2013.01); *B29C 66/1122* (2013.01); *B29C 66/532* (2013.01);
(Continued)

(58) Field of Classification Search
CPC . B29C 65/022; B29C 66/1122; B29C 66/532; F16J 12/00; F17C 1/00
(Continued)

(56) References Cited

U.S. PATENT DOCUMENTS 3,921,847 A * 11/1975 Rentmeester ...... B21D 51/2676
138/146
4,319,945 A * 3/1982 Howden .................. G02B 3/04
156/212
5,034,084 A * 7/1991 Schafer .................. B44C 3/085
156/276

FOREIGN PATENT DOCUMENTS

| EP | 0116453 | 8/1984 |
| GB | 1159972 | 7/1969 |
| GB | 1161846 | 8/1969 |

OTHER PUBLICATIONS

International Search Report, International Application No. PCT/EP2014/056030, dated Jun. 27, 2014.

* cited by examiner

*Primary Examiner* — James Sells
(74) *Attorney, Agent, or Firm* — Perman & Green LLP

(57) ABSTRACT

The invention concerns a method for producing, by welding, a link between an element made from any material, for example metal, and an element made from a thermoplastic-matrix composite material, the second element being produced by depositing a textile yarn pre-impregnated with a thermoplastic material on the surface of the first element. The method mainly includes an operation consisting of producing an interface coating consisting of an epoxy resin filled with a thermoplastic material powder, coating the surface of the element made from any material with same, and leaving the coating to polymerize. It next includes an operation consisting simultaneously of forming the second element and welding same to the coating deposited on the surface of the first element by locally heating the two elements, when depositing the pre-impregnated textile on the first element.

11 Claims, 1 Drawing Sheet

(51) Int. Cl.
    *B29C 65/00* (2006.01)
    *F16J 12/00* (2006.01)
    *F17C 1/00* (2006.01)
    B29C 53/60 (2006.01)
    B29L 31/00 (2006.01)
    B29C 65/48 (2006.01)
    B29C 63/24 (2006.01)

(52) U.S. Cl.
    CPC ............... *F16J 12/00* (2013.01); *F17C 1/00* (2013.01); B29C 53/602 (2013.01); B29C 63/24 (2013.01); B29C 65/02 (2013.01); B29C 65/4815 (2013.01); B29C 65/4865 (2013.01); B29C 66/69 (2013.01); B29C 66/71 (2013.01); B29C 66/7392 (2013.01); B29C 66/7394 (2013.01); B29C 66/83411 (2013.01); B29L 2031/7156 (2013.01); B29L 2031/7172 (2013.01); F17C 2201/0104 (2013.01); F17C 2203/0604 (2013.01); F17C 2203/0619 (2013.01); F17C 2203/0636 (2013.01); F17C 2203/0663 (2013.01); F17C 2209/22 (2013.01); F17C 2209/221 (2013.01); F17C 2209/232 (2013.01); F17C 2221/012 (2013.01); F17C 2221/033 (2013.01); F17C 2221/08 (2013.01); F17C 2223/0161 (2013.01); F17C 2223/035 (2013.01); Y02E 60/321 (2013.01)

(58) Field of Classification Search
    USPC ........................................................ 156/73.5
    See application file for complete search history.

LINK BETWEEN A THIN METAL LINER AND A COMPOSITE WALL BY THERMOPLASTIC PARTICLE-FILLED COATING

CROSS REFERENCE TO RELATED APPLICATIONS

This application is the National Stage of International Application No. PCT/EP2014/056030, having an International Filing Date of 26 Mar. 2014, which designated the United States of America, and which International Application was published under PCT Article 21(s) as WO Publication No. 2014/161753 A1, and which claims priority from, and the benefit of French Application No. 1352986, filed 3 Apr. 2013, the disclosures of which are incorporated herein by reference in their entireties.

BACKGROUND

1. Field

The presently disclosed embodiment relates to the general field of producing tanks made of high-performance composite materials, intended for storing pressurized fluids.

The presently disclosed embodiment applies in particular to tanks made of thermoplastic matrix composite materials, but may be applied to tanks made of composite materials comprising other types of matrices (radiation-polymerizable, thermosetting, etc. matrices).

More generally, the presently disclosed embodiment applies to the field of the transport and storage of fluids, optionally cryogenic storage, for example to the transport of liquefied gas by methane tankers, to the storage of liquid hydrogen for automotive applications, or to the liquid propellant tanks of launch vehicles such as the Ariane European launch vehicle.

2. Brief Description of Related Developments

High-performance tanks made of composite material are in general produced by the technique of filament winding (i.e. by winding) of (pre)impregnated fibers or else by a variant thereof such as fiber placement.

High-performance tanks are understood to mean tanks that are optimized in terms of weight/strength ratio, such as those used in particular in the fields of the space industry and the transport industry generally.

In the particular case of applications in the space industry, the use of high-performance tanks is induced by the need to store gases under pressure, optionally under cryogenic conditions, in other words at very low temperature.

The high-performance composite tanks intended in particular for storing pressurized fluids are generally designed by separating the functions of leaktightness and of mechanical resistance to the pressure. Such a tank thus comprises:

a shell made of metal or made of a polymer material, referred to as a "liner", responsible for ensuring the containment of the fluid, that is to say the leaktightness of the tank and, optionally, the chemical protection of the wall made of composite material with respect to the fluid contained;

a composite coating that ensures the mechanical strength of the tank, resistance to the internal pressures in particular, which coating is formed of fibers deposited on the liner by filament winding, or by any equivalent method.

Since the shell (liner) has no mechanical function, it is in principle thin, knowing that, in a high-performance tank, it is naturally sought to minimize the masses. Since this thinness gives it little mechanical strength, the liner is usually placed on a support mandrel.

However, for reasons of simplification of the manufacture, it is possible to give the liner other functions, in particular at the stage of producing the tank. Thus, in the case of small-sized tanks, the liner may be used as a winding mandrel during the deposition of the composite material fibers. It must therefore be able to withstand, without deforming, the forces induced by the deposition of the fibers, which requires the liner to have a sufficient thickness to withstand these forces Similarly, the liner may be used as a reference surface of the composite structure deposited. It must then be able to exhibit a certain stiffness.

When such structures are produced, one problem to be taken into account is that of the behavior of the liner during the use of the tank, which is characterized by successive fillings and emptyings, therefore successive pressurizations, and also by thermal cycles in the case of cryogenic fluids. In particular, the emptying operations result in a compression of the liner by the composite wall.

Consequently, there are two cases:

either the tank is of small size (1 $m^3$ typically). In such a case, the liner may have a sufficient thickness to withstand this compression without buckling, this thickness being, for example, imposed by the manufacturing principle of the liner or else by usage characteristics of the liner such as the direct use of the liner as a winding tool. There is thus no particular precaution to be taken regarding a bond between the liner and the composite wall.

or the tank is of large size or else the liner is very thin or has a very low stiffness. In such a case, it cannot withstand this compression. It is then necessary to connect the liner to the composite wall, in general by adhesive bonding.

Consequently, there is therefore, in a good many production cases, a need to be able to connect the liner to the composite wall.

However, although the joining of two high-performance thermoplastic matrix composite materials by welding generally requires known joining processes (cf. the book by Michael J. Troughton entitled "Handbook of Plastics Joining" (Plastics Design Library) ISBN: 978-1-884207-17-4), no technique exists to date, among the known joining techniques, that makes it possible to join an element made of thermoplastic material to an element made of another material, especially a polymer or metal material, and that gives the joint produced the required qualities, in terms of mechanical strength in particular.

This is especially the case as regards the joining of the liner that forms a tank and of the protective wall that covers it.

SUMMARY

One objective of the presently disclosed embodiment is to propose a solution that makes it possible to carry out the structural joining, via welding, of an element made of thermoplastic material and of an element made of polymer material or metal.

For this purpose, one aspect of the presently disclosed embodiment is a process for providing the assembly between a first structural element made from a first material and a second structural element made from a thermoplastic matrix composite material. The process according to the presently disclosed embodiment mainly comprises the following steps:
- a first step of preparing a coating, said coating consisting of an epoxide resin, wherein a proportion of powder of a thermoplastic material is incorporated;
- a second step of coating, during which the coating is applied to the surface of the first structural element;
- a third step during which the coating is polymerized;
- a fourth step, during which the first structural element covered with its coating is welded to the second structural element to which it must be assembled.

According to various provisions optionally used in conjunction, the process according to the presently disclosed embodiment has the features listed below.

According to one particular aspect, the fourth step comprises an operation during which the second structural element is formed by depositing the thermoplastic material at the surface of the first structural element; the welding of the first structural element to the second structural element being carried out at the moment when the thermoplastic material is deposited at the surface of the first structural element.

According to a variant of the preceding aspect, since the formation of the second structural element being carried out by depositing a textile yarn pre-impregnated with a thermoplastic matrix on the surface of the first structural element, the actual welding is carried out by locally heating the two structural elements, in the deposition zone of the textile yarn.

According to another particular aspect, the fourth step is carried out by placing the surface of the second structural element in contact with the surface of the first structural element coated with its coating, by placing the two elements in an oven, and by bringing the oven to a temperature sufficient to cause the melting of the thermoplastic materials constituting the coating of the first structural element and the second structural element.

According to another particular aspect, the coating consisting of a thermosetting monomer comprising two components to be mixed, the step of preparing the coating consists in mixing a proportion of a thermoplastic material powder with one of the components, then in introducing the other component into the mixture.

According to a variant of the preceding aspect, said powder consists of a thermoplastic material, selected for its compatibility with the thermoplastic material constituting the second structural element.

According to another variant of the preceding aspect, since the second structural element is made of carbon/polyamide PA12 composite, said thermoplastic material powder consists of polyamide PA12.

According to another particular aspect, the proportion of thermoplastic material powder incorporated into the coating is determined so as to obtain the desired tensile strength and the desired failure pattern after tearing.

According to another particular aspect, the step of coating the surface of the first structural element with the coating is carried out by depositing the mixture constituting said coating on the surface of the first structural element and spreading the mixture over this surface so as to form a layer having the desired thickness.

According to another particular aspect, the polymerization step consists, after coating, in leaving the surface of the first structural element at rest at a given temperature, for the time necessary for the polymerization of the material constituting the coating.

According to another particular aspect, since the formation of the second structural element is carried out by a filament winding technique, the first structural element acting as a winding mandrel for the yarn of composite material, the actual winding means are here combined with means that make it possible to locally heat the deposition zone of the yarn, the thermal energy applied locally being sufficient to bring about the local melting of the thermoplastic material of the second structural element and of the thermoplastic material of the coating, so that the yarn forming the second structural element is welded to the coating that covers the surface of the first structural element.

BRIEF DESCRIPTION OF THE DRAWINGS

The features and advantages of the presently disclosed embodiment will be better appreciated upon reading the following description, which is based on the appended figures which show.

DETAILED DESCRIPTION

As has been stated above, the object of the presently disclosed embodiment is to enable the joining, via welding, of a first element, not formed of a thermoplastic material, an element made of polymer material or else an element made of metal for example, to a second element made of thermoplastic composite material.

It is particularly, but not exclusively, suitable for producing a fluid tank comprising an inner envelope, or liner, intended to contain the fluid in a leaktight manner, covered by a mechanically strong wall made of thermoplastic composite material formed directly around the liner, by the filament winding technique for example, the inner envelope and the mechanically strong protective wall, of different natures, being joined by welding to one another.

Figure 1:
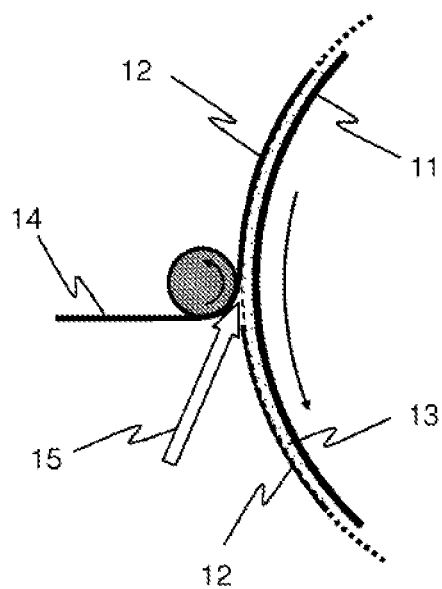
FIG. 1 is an illustration of the principle for implementing the joining process according to the presently disclosed embodiment by way of a particular application example relating to the production of a tank comprising a liner and a composite wall.

In the remainder of the description, the features of the process according to the presently disclosed embodiment are described by way of an implementation example, illustrated by FIG. 1, relating to the production of such a tank comprising an inner envelope (liner) made of aluminum covered by a mechanical protective wall made from a thermoplastic composite material of T300 carbon fibers pre-impregnated with polyamide PA12 resin. However, a person skilled in the art will easily understand on reading the following text that the object of the presently disclosed embodiment is not limited to this sole application and that the process according to the presently disclosed embodiment may be carried out in order to ensure a joining, via welding, of two elements, one of which is made of thermoplastic composite material and the other of a different material.

The joining process according to the presently disclosed embodiment consists firstly in carrying out the deposition, on the first element to be joined 11, the liner in the example presented here, of a coating 13 made of material of thermosetting polymer type comprising fillers, the composition of which is similar to that of the material forming the matrix of the composite material constituting the second element 12 to be joined, here the wall of the tank.

It then consists in carrying out the welding of the coating 13 attached to the liner and of the composite material of the protective wall 12, at the moment when the latter is deposited at the surface of the liner 11 in order to form said wall.

Consequently, the process according to the presently disclosed embodiment mainly comprises the following steps:
- a first step of preparing the coating 13, said coating consisting for example of an epoxide resin, of ARALDITE® type for example, in which particles of thermoplastic material are incorporated;
- a second step of coating, during which the coating 13 is applied to the surface of the liner 11;
- a third step during which the coating 13 is polymerized;
- a fourth step, during which the liner 11 covered with its coating 13 is welded to the mechanically strong wall 12 to which it must be joined.

According to the presently disclosed embodiment, the first element 11 generally undergoes a surface treatment suitable for the material of which it is made. The objective of the surface treatment operation is to strengthen the adhesion of the coating 13 to the surface of the first element, here the liner 11. For this purpose, it uses any known means suitable for the material constituting this element.

Thus, for an aluminum liner for example, this step may implement the following operations:
- degreasing of the aluminum with a suitable solvent, for example methyl ethyl ketone (MEK);
- drying for a given period of time, for example half an hour;
- polishing the face to be coated by sanding with an abrasive of Scotch-Brite® type until the surface is rendered mat,
- degreasing of the aluminum with a suitable solvent, for example MEK;
- drying for a given period of time, for example half an hour.

Alternatively, in the case of aluminum alloys, this operation may implement other processes such as, for example, an anodization.

So as to strengthen the adhesion of the coating 13 to the surface of the liner 11, these operations may optionally be supplemented, if necessary, with other operations, in particular:
- an operation for the brush coating of an EC3901 adhesion primer from 3M;
- an operation for drying for a minimum of one hour at ambient temperature.

The step of preparing the coating 13 consists in constituting the mixture of the components forming this coating, in the desired proportions. The coating 13 preferably consists of a thermosetting monomer of epoxy resin type comprising two components, a base and a hardener.

In order to do this, the base or the hardener is firstly mixed with the thermoplastic material, then the second component of the resin is added just before the coating operation, the base-hardener mixture having a limited pot life.

The thermoplastic material is introduced here in the form of a powder having a given particle size, of the order of 50 µm for example. It is chosen for its compatibility with the thermoplastic material constituting the second element 12.

In one particular aspect, the thermoplastic material mixed with the constituents of the coating is selected from the same material as that which constitutes the matrix of the composite material to which the liner, covered by its coating, must be welded. It should be noted however that the thermoplastic material used may be different, in particular in order to satisfy as best possible the twofold requirement of good adhesion of the two thermoplastic materials (i.e. that of the composite material of the element 12 and that used to produce the coating of the element 11) and of good compatibility of the thermoplastic material incorporated into the coating and of the other constituents of the coating.

The term "compatibility" is understood mainly to mean, in this case, a physicochemical compatibility between the materials. This compatibility results in a possible interaction between the thermoplastic material of the powder incorporated and the resin in which this powder is incorporated to form the coating 13 on the one hand, and between this material and the thermoplastic material constituting the wall 12, which interaction a person skilled in the art of plastics chemistry knows how to characterize by specific criteria, of somewhat chemical nature: wettability, interdiffusion between the materials, chemical bonds.

Thus, if the protective wall of the liner 11 is made of carbon/polyamide PA12 composite, polyamide PA12 will be mixed for example with the components forming the epoxy resin.

According to the presently disclosed embodiment, the proportion of thermoplastic material powder incorporated into the mixture, a powder obtained by micronization of the material for example, is defined so as to obtain the most solid bonding possible, this criterion of solidity taking into account both the tensile strength of the liner/coating joint produced and also the failure pattern obtained after failure of the joint.

Also according to the presently disclosed embodiment, the mixing is carried out here by taking into account the recommendations of the manufacturer (proportions, pot life of the mixture before polymerization) regarding the epoxy resin. Such recommendations relating to ARALDITE® AY 103 are presented by way of example in the table below.

| Products | AY 103-1 (resin) | HY991 (hardener) | Mixture |
|---|---|---|---|
| Pot life (at 25° C.) | | | 90 min |
| Proportions (by weight) | 100 | 40 | |

The step of coating the surface of the liner 11 with the coating 13 is carried out by depositing the mixture described above on the surface and spreading the mixture over this surface so as to form a layer of coating 13 having the desired thickness. The deposition may be carried out by using, in a known manner, tools such as calibrated doctor blades, or calibrated spiral bar coaters if the viscosity of the mixture allows, as is in particular the case with Araldite 30% filled with PA12, or any other suitable equipment for spreading the coating 13 at the surface of the liner 11. As illustrated in FIG. 1, a coating 12 of substantially constant thickness, typically of the order of a hundred microns, is thus obtained, which covers the entire surface of the liner 11.

When the coating phase is finished, the coated surface is left at rest for the time necessary for the polymerization of the coating 13, for example for 24 hours for curing at ambient temperature. The coating 13 including the fillers is thus polymerized after deposition on the surface of the liner 11 and before the start of the deposition of the composite material.

According to the presently disclosed embodiment, the parameters relating to the coating, such as its composition, its thickness and the polymerization conditions (processing parameters) are deduced from prior tests, such as those as described further on in the text, carried out on test specimens.

However, regarding the thickness, this must be greater than the size of the thermoplastic additive particles introduced into the coating, while in principle remaining thin. Thus, for a coating thickness of 100 µm, 50 µm particles are for example selected.

Furthermore, regarding the polymerization conditions, these are in principle defined by the resin manufacturer, knowing that the polymerization time decreases with the increase in the temperature and that the choice of the specific conditions also depends on the actual part to be produced.

During the fourth step, the liner 11 covered by its coating 13 is welded to the mechanically strong wall to which it must be joined. This welding is carried out by a supply of thermal energy sufficient to cause the melting of the thermoplastic materials of the composite of the wall 12 and of the coating 13.

According to the presently disclosed embodiment, and within the context of the manufacture of a tank in particular, the welding of the liner 11 covered by its coating 13 to the mechanically strong wall 12 to which it must be joined is carried out simultaneously with the operation for forming the wall 12 made of composite material, the formation of the wall 12 being carried out by depositing the composite material yarn by yarn and layer on layer at the surface of the liner 11. The joining of the liner 11 to the composite wall 12 is thus carried out when the first layer of composite material is deposited.

The formation of the wall 12 may for example be carried out by a conventional filament winding technique, the liner 11 acting here as a winding mandrel for a yarn 14 of composite material. As illustrated in FIG. 1, the actual winding means are then combined with means that make it possible to locally heat, in the deposition zone of the yarn 14, the surface of the structure being produced, as illustrated by the arrow 15.

According to the presently disclosed embodiment, the thermal energy applied locally is sufficient to bring about the local melting of the thermoplastic matrix which coats the fibers of the yarn 14 of the composite material deposited on the liner 11, or more specifically on the coating 13 covering the liner 11. In this way, the first layer of yarn 14 of thermoplastic material deposited at the surface of the liner 11 is welded with the coating 13 that covers the latter.

Also according to the presently disclosed embodiment, the supply of thermal energy may be carried out by any suitable means that makes it possible to create a local melting of the thermoplastic material, by lighting the contact area by means of a laser beam for example.

As regards such a joint, one important parameter in the implementation of the process according to the presently disclosed embodiment consists in determining the proportions of thermoplastic material incorporated in the coating 13, and also the particle size of the material incorporated.

These parameters, specific to each joint produced, depend in particular on the nature of the elements to be joined and are not generally easy to accurately determine in an entirely theoretical manner. This is why preliminary tests are generally carried out using test specimens such as the one illustrated in FIG. 2.

A test specimen consists here of a sandwich structure formed of a plate 21 made from the material constituting the liner 11, an aluminum plate for example, coated on both its faces with a coating layer 22, 23, and placed between two plates 24, 25 made from the composite material constituting the mechanically strong wall 12. According to one aspect variant of the joining process according to the presently disclosed embodiment, a variant that is suited to the overall production of sizes compatible with being placed in an oven, the plate 21 is welded to the two plates 24, 25, not by local supply of thermal energy, but by placing the assembly in an oven and by bringing the oven to a temperature sufficient to cause the melting of the thermoplastic materials constituting the coating of the plate 21 and the plates 24 and 25.

Various test specimens are thus produced, the coating layers 22 and 23 incorporating different proportions of thermoplastic material for each test specimen that are determined a priori. Consequently, the optimal proportions of thermoplastic material are determined by subjecting the various test specimens to tensile forces, shown by the arrows 26 and 27 in FIG. 2, and by retaining the proportions of thermoplastic material corresponding to the test specimen that has the highest mechanical performance in terms of tensile strength in particular.

Figure 2:
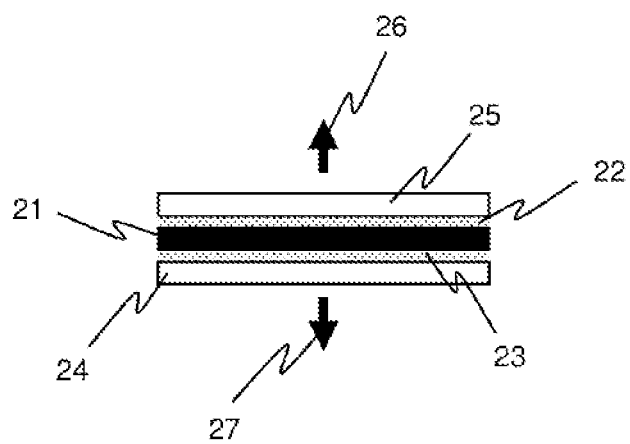
FIG. 2 is a schematic illustration of the sandwich structure of a test specimen intended to define the optimal composition of the coating intended to be deposited on a polymer or metal element in order to enable the joining thereof by welding to an element made of thermoplastic composite material.

The table below presents, by way of example, the results of tensile tests relating to test specimens such as the one illustrated in FIG. 2, having variable proportions of thermoplastic material in the coating. The tests were carried out here at ambient temperature, typically at 20° C., and at low temperature, typically −150° C.

| Prepreg manufacturer | % PA12 (by weight) | Test temperature | Mean tensile strength (MPa) | Failure pattern |
|---|---|---|---|---|
| Soficar (Tory) | 40 | Ambient | 7.67 ($\sigma$ 1.96) | Mixed failure: 50% cohesive in the composite. 50% adhesive on the aluminum side. |
| Soficar (Tory) | 40 | −150° C. | 2.9 ($\sigma$ 1.67) | Adhesive failure: 50% on the aluminum side. 50% on the composite side |
| Soficar (Tory) | 20 | Ambient | 10.30 ($\sigma$ 1.20) | Predominantly cohesive failure in the composite and to a minor extent adhesive failure on the aluminum side. |
| Soficar (Tory) | 20 | −150° C. | 4.6 ($\sigma$ 0.57) | Mixed failure: 50% cohesive in the composite. 50% adhesive on the aluminum side (with a few fibers on the coating). |
| Soficar (Tory) | 30 | Ambient | 15.91 ($\sigma$ 0.59) | Predominantly cohesive failure in the composite and to a minor extent mixed |

-continued

| Prepreg manufacturer | % PA12 (by weight) | Test temperature | Mean tensile strength (MPa) | Failure pattern |
|---|---|---|---|---|
| Soficar (Tory) | 30 | −150° C. | 5.8 (σ 2.55) | (50% cohesive/50% adhesive) failure on the aluminum side. Predominantly cohesive failure in the composite and to a minor extent adhesive failure on the aluminum side. |
| Suprem SA | 30 | −150° C. | 5.81 (σ 1.95) | Predominantly cohesive in the composite and to a minor extent adhesive on the aluminum side. |
| Suprem SA | 50 | Ambient | 9.2 (σ 1.91) | Predominantly adhesive failure on the composite side and to a minor extent adhesive failure on the aluminum side. |

It is observed, on reading this table, that the formulations containing 30% of micronized thermoplastic material powder are satisfactory both at ambient temperature (strength) and at cryogenic temperature (nature of the failure). Consequently, in such a context, the tests carried out will lead to a proportion of thermoplastic material in the coating close to 30% being adopted.

Thus, insofar as the mechanical strength of a welded bond is very generally greater than that of an adhesively bonded bond, the joining process according to the presently disclosed embodiment thus appears to be a particularly advantageous alternative joining solution to the existing adhesive bonding joining solutions.

It is particularly well suited to the implementation of the filament winding technique insofar as the application of pressure on the yarn at the time of its deposition and the local heating at the location of the deposition are of very short duration, which duration is only sufficient to carry out the local melting of the thermoplastic materials, of the order of a few milliseconds typically, the yarn being deposited on the liner "on the fly".

The formation of a mechanically strong wall and the joining thereof to the liner may thus be advantageously carried out simultaneously, such a simultaneity not being compatible with the requirements of creating a bond by adhesive bonding between the liner and the mechanically strong wall. Indeed, for such a joint, the pressure and the temperature must be maintained for a duration of several minutes at least in order to ensure the polymerization of the coating that covers the liner, which polymerization provides the joint. The filament winding technique would then require a post-curing of the whole of the part, which eliminates a large part of the advantage of the winding (or fiber placement) technology.

It additionally appears well suited to the production of objects, such as tanks, comprising a flexible wall or envelope that defines an internal volume, surrounded by a reinforcing or protective wall made of composite material, for which it is necessary, for various reasons, to firmly attach the two walls.

After welding, it is indeed no longer an interface between the two elements thus joined, due to the reciprocal diffusion of the molecules from one of the elements of the joint to the other element, contrary to what occurs in the case of adhesive bonding where there are as many interfaces as layers needed for the creation of the bond between the two elements to be joined (adhesive layer, adhesion primers, treatments of each surface to be joined, etc.).

Such a joining method is, moreover, advantageous insofar as it makes it possible to avoid problems of surface preparation and of protection against pollution, which are very sensitive in the case of joining via adhesive bonding.

Moreover, unlike joining via adhesive bonding which requires a heating up of the joined materials and of the joining adhesive, and which also requires the adhesive used to be selected so that the adhesive bonding temperature is not likely to lead to an overheating of the parts to be joined, which selection is sometimes carried out at the expense of the final adhesively-bonded bond performance, joining via welding is advantageously not subjected to thermal compatibility requirements.

What is claimed is:

1. A process for providing the assembly between a first structural element made from a first material and a second structural element made from a thermoplastic matrix composite material, comprising the following steps:
    a first step of preparing a coating, said coating consisting of an epoxide resin, wherein a powder of particles of a thermoplastic material is incorporated;
    a second step of coating, during which the coating is applied to the surface of the first structural element;
    a third step during which the coating is polymerized;
    a fourth step, during which the first structural element covered with its coating is welded to the second structural element to which it must be assembled.

2. The process as claimed in claim 1, wherein the fourth step further comprises an operation during which the second structural element is formed by depositing the thermoplastic material at the surface of the first structural element; the welding of the first structural element to the second structural element being carried out at the moment when the thermoplastic material is deposited at the surface of the first structural element.

3. The process as claimed in claim 2, wherein, formation of the second structural element being carried out by depositing a textile yarn pre-impregnated with a thermoplastic matrix on the surface of the first structural element, the actual welding is carried out at the same time as the formation of the second structural element by locally heating the two structural elements, in the deposition zone of the textile yarn.

4. The process as claimed in claim 1, wherein the fourth step is carried out by placing the surface of the second structural element in contact with the surface of the first structural element coated with its coating, by placing the two elements in an oven, and by bringing the oven to a temperature sufficient to cause the melting of the thermoplastic materials constituting the coating of the first structural element and the second structural element.

5. The process as claimed in claim 1, wherein, the coating consisting of a thermosetting monomer further comprises two components to be mixed, the step of preparing the coating consists in mixing a proportion of a thermoplastic material powder with one of the components, then in introducing the other component into the mixture.

6. The process as claimed in claim 1, wherein said powder consists of a thermoplastic material, selected for its compatibility with the thermoplastic material constituting the second structural element and with the other constituents of the coating.

7. The process as claimed in claim 6, wherein the second structural element is made of carbon/polyamide PA12 composite, said thermoplastic material powder consists of polyamide PA12.

8. The process as claimed in claim 1, wherein the proportion of thermoplastic material powder incorporated into the coating is determined so as to obtain the desired tensile strength and the desired failure pattern after tearing.

9. The process as claimed in claim 1, wherein the step of coating the surface of the first structural element with the coating is carried out by depositing the mixture constituting said coating on the surface of the first structural element and spreading the mixture over said surface so as to form a layer having the desired thickness.

10. The process as claimed in claim 1, wherein the polymerization phase consists, after coating, in leaving the surface of the first structural element at rest at a given temperature, for the time necessary for the polymerization of the material constituting the coating.

11. The process as claimed in claim 2, wherein, the formation of the second structural element is carried out by a filament winding technique, the first structural element acting as a winding mandrel for the yarn of composite material, the actual winding means are here combined with means that make it possible to locally heat the deposition zone of the yarn, the thermal energy applied locally being sufficient to bring about the local melting of the thermoplastic material of the second structural element and of the thermoplastic material of the coating, so that the yarn forming the second structural element is welded to the coating that covers the surface of the first structural element.

\* \* \* \* \*